(12) United States Patent
Harrington

(10) Patent No.: US 6,480,196 B1
(45) Date of Patent: Nov. 12, 2002

(54) METHOD AND SYSTEM USING VARIABLE LINE WIDTH ADJUSTMENT WITH REDUCED SCAN BUFFERING THAT IS COMPATIBLE WITH ANTIALIASING

(75) Inventor: Steven J. Harrington, Webster, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/466,873

(22) Filed: Dec. 20, 1999

(51) Int. Cl.$^7$ ............................................. G06T 11/20
(52) U.S. Cl. ...................................................... 345/443
(58) Field of Search ........................... 345/89, 90, 443, 345/611, 613, 614, 694, 698; 348/134, 629; 358/261.3, 298, 429, 433, 456, 459, 1.1, 534, 536; 382/269, 299; 347/131, 249

(56) References Cited

U.S. PATENT DOCUMENTS 4,868,670 A * 9/1989 Morton et al. ............... 358/447
5,140,315 A * 8/1992 Edelson et al. ............... 340/728

* cited by examiner

Primary Examiner—Michael Razavi
Assistant Examiner—G. F. Cunningham
(74) Attorney, Agent, or Firm—Oliff & Berridge, PLC

(57) ABSTRACT

A method and system compensates for the line width growth or shrinkage in an image rendering system that supports high-addressability. The amount of width adjustment can be a function of the line width. The method is applied after rendering, to the sub-pixel, bit patterns and is compatible with antialiasing and other sub-pixel rendering techniques such as half-bitting. The method and system also require less scan buffering for marker line width compensation than conventional methods. More specifically, the method and system require N+3 scans to detect and adjust widths up to N pixels for leading edges or trailing edges rather than the 2N+3 necessary conventionally. Moreover, the detection and adjustment of widths up to N pixels may be performed for both leading edges and trailing edges using a buffer that can handle 2N+3 scans.

32 Claims, 7 Drawing Sheets

METHOD AND SYSTEM USING VARIABLE LINE WIDTH ADJUSTMENT WITH REDUCED SCAN BUFFERING THAT IS COMPATIBLE WITH ANTIALIASING

BACKGROUND OF THE INVENTION

1. Field of Invention

The invention relates to an apparatus and a method for controlling lines rendered by a printer or displayed on a monitor that is compatible with antialiasing image data and requires a minimal amount of scanned image data buffering.

2. Description of Related Art

Today's marking devices typically do not match the idealized printer model used in the construction of images. For example, instead of crisp, square, non-overlapping pixels, as shown in FIG. 1, a real device may draw large, circular spots with gradual boundaries that overlap to fully cover the pixel areas, as shown in FIG. 2.

When lines and characters are drawn using these real spots, they may be thicker or thinner than their intended ideal. The actual behavior of the marker can be complex, for example, making thin lines too thick and thick lines too thin. A rendering process can be employed to adjust the width of lines and characters to compensate for the marker. One approach is to adjust the width of lines when they are rasterized, but is not always effective because the line may not always remain in isolation. For example, one might construct a color sweep by drawing a series of lines of varying color one next to another. Accordingly, adjusting the width of each line in isolation might only serve to destroy the sweep. An alternative approach is to analyze the completely rasterized image to detect lines and to alter their widths. However, to detect and alter lines up to width N pixels in a conventional manner, where the alteration is a function of line width, requires a window of 2N+3 pixels square. Thus, 2N+3 scan lines must be buffered. However, this memory is expensive if the width N is large.

SUMMARY OF THE INVENTION

The exemplary embodiments of the invention provide a method and system for compensating for the line width growth or shrinkage in an image rendering system that supports high-addressability. The amount of width adjustment can be a function of the line width. The method is applied after rendering, to the sub-pixel, bit patterns and is compatible with antialiasing and other sub-pixel rendering techniques such as half-bitting. The method and system also require less scan buffering for marker line width compensation than conventional methods. More specifically, the method and system require N+3 scans to detect and adjust widths up to N pixels instead of the 2N+3 necessary conventionally.

This, and other features and advantages of this invention are described in or are apparent from the following detailed description of the system and methods according to this invention.

BRIEF DESCRIPTION OF THE DRAWINGS

The benefits of the present invention will be readily appreciated and understood from consideration of the following detailed description of the exemplary embodiment of this invention, when taken with the accompanying drawings, in which same numbered elements are identical and.

DETAILED DESCRIPTION OF PREFERRED EMBODIMENTS

Modern rendering technology of ten allows high addressability in at least one direction (typically the fast-scan direction for laser printers). This can offer several advantages. It gives more freedom for the design of better halftone dots. It can be used for the antialiasing of object edges. Additionally, it can be used for finer control over width compensation. There is an issue, however, in how these various purposes interact. More specifically, the present invention is particularly directed to a method of performing width adjustment that is compatible with performing antialiasing.

As a result, it is preferred that the system for variable line width adjustment according to the exemplary embodiments is preferably located in an image path after halftoning and antialiased rendering is performed. The method of performing variable line width adjustment may, and is preferably, performed in an image rendering system in conjunction with halftoning, antialiased rendering and color image correction. The method and system act on raster image data. This raster image data is ideal image data. The operation of the system and performance of the method allow the ideal image data be rendered effectively using an image rendering device, which is inherently non-ideal.

Thus, line width detection and adjustment are applied to the high-addressability specification of an image. If, for example, processing begins with 400×400 spots per inch (spi) contone image data and halftoning is performed with antialisaed render to 8×addressability, then a 400×3200 spi binary image is provided. It is this 400×3200 ppi image data upon which the line width detection and adjustment is performed. The high-addressibility sub-pixels can be accessed in groups of eight, where each group corresponds to a single pixel of the original 400×400 spi image data.

Figure 1:
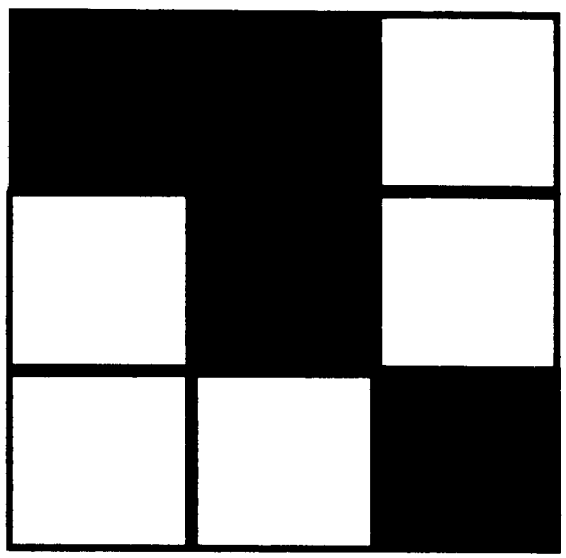
FIG. 1 illustrates a pattern of ideal of square, non-overlapping pixels.
Figure 2:
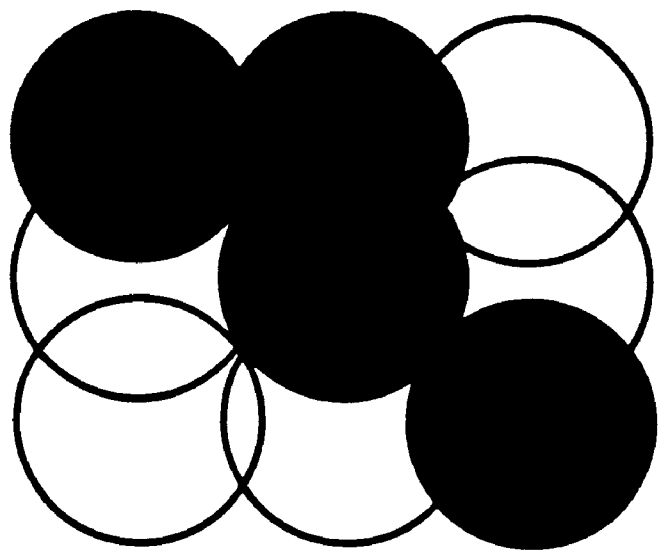
FIG. 2 illustrates a pattern of realistic large, circular spots with gradual boundaries that overlap to fully cover the pixel areas.
Figure 3:
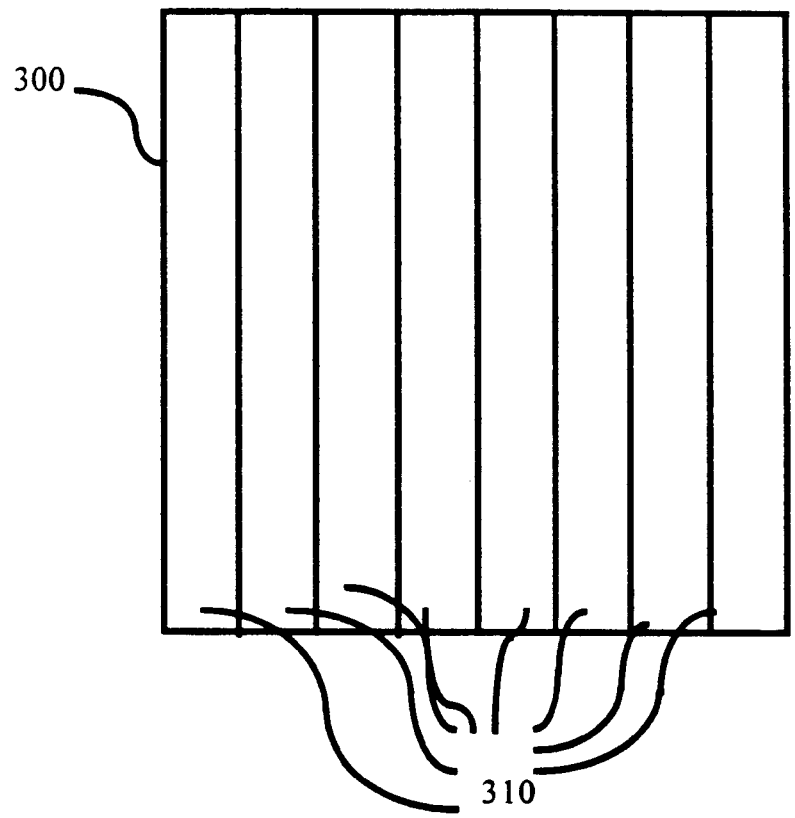
FIG. 3 illustrates a pixel sub-divided into eight sub-pixels.

An line width adjustment method performed in accordance with the exemplary embodiment processes the image in this way. Thus, the method processes groups of sub-pixels where each group represents a non-overlapping square region of the image. For example, as shown in FIG. 3, a pixel 300 is divided into eight sub-pixels 310.

The reduction of the buffer requirements from 2N+3 to only N+3 is accomplished by examining each pixel more than once. The compatibility with antialiasing implies that the adjustments can extend beyond the edge pixel either lengthening or shortening. Thus, pixels on each side of a line can be altered; such is the nature of overflow. Each pixel is examined eight times for possible changes. Throughout the explanation of the exemplary embodiments, it is assumed that the line width adjustments do not exceed one pixel at each side. Thus, line widths change at most by a width of two pixels. The methods for performing line width adjustment performed in accordance with the exemplary embodiments can be generalized to greater changes. However, for handling line width changes in excess of two pixel widths requires buffering additional scan lines and performing additional examination of image pixels.

The methods performed in accordance with the exemplary embodiments examine the image data to identify runs of black or white, i.e., non-gray, pixels. In a black or white pixel, the sub-pixel values all have the same value, i.e., all black or all white. Short runs may be line cross-sections; thus, a short run's run length would be the line width.

Figure 4:
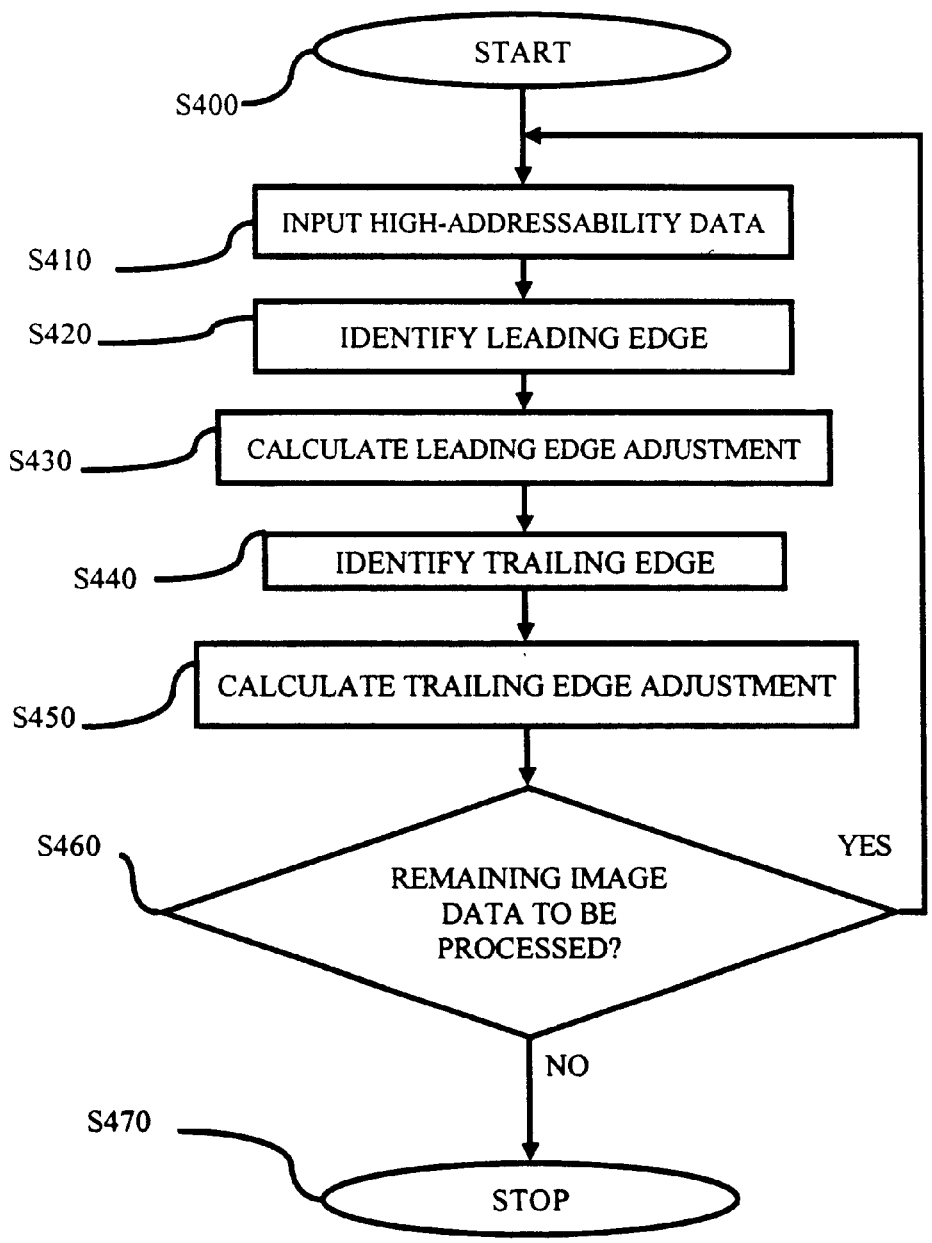
FIG. 4 is a flow chart illustrating a method of line width adjustment in accordance with the exemplary embodiment.

As shown in FIG. 4, the method for line width adjustment begins in step S400 and control proceeds to step S410. In step S410, high-addressability image data is input into a pixel buffer by, for example, scanning an image, and control proceeds to step S420. In step S420, a leading edge of a horizontal or diagonal line is identified within the high-addressability image data.

Figure 5:
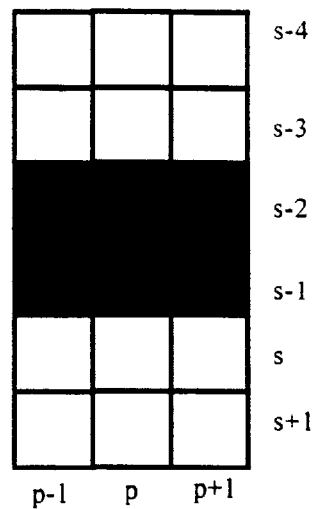
FIG. 5 illustrates a vertical sequence of pixels.

Performance of step S420 differs depending on whether a horizontal line or a diagonal line is being analyzed. For a horizontal line, a vertical sequence of pixels is examined as illustrated in FIG. 5. This can be performed using a table look up, indexed by bits indicated whether the pixels in the vertical sequence are black, white, or gray. This may also be performed using logical operations.

For example, a test may be performed to determine if a pixel at position p in scan s is the leading edge of a horizontal line. In such a test, a pixel at (p, s+1) must be non-gray. The value of the pixel at (p, s) must not match the value of the pixel at (p, s+1). The values of the pixels at (p, s−i) are examined for i starting at one and incrementing while the values are the complement of the pixel at (p,s+1). In other words, if the pixel at (p, s+1) is white, then the number of black pixels trailing the pixel at (p,s) are counted. The value of i is incremented until the color changes or the buffered pixels are all analyzed. The final value of i becomes the length of the run. This run length indicates the thickness of the line and is used to determine the amount of adjustment.

Figure 6:
FIG. 6 illustrates a buffer used in conjunction with the exemplary embodiment of the invention.

To make optimal use of the pixel buffer, the scan at s+1 should be the line most recently entered into the buffer as shown in FIG. 6.

It should be recognized that it may be beneficial, in step S420, to check whether either the pixel at (p−1, s) or (p+1, s) differs in value from that at (p, s+1) to help determine whether the pixels correspond to an edge of a horizontal line. If the pixels fail the test, i.e., either the pixel at (p−1, s) or (p+1, s) is the same as the value of pixel (p, s+1), further processing on the run can be stopped because the pixels do not represent an edge of a horizontal line.

Another possible refinement is a test for noise in the form of single light pixels (run length zero) on a white background or single dark pixels on a black background. If the pixel run fails the test, further processing on the pixel run is terminated. An isolated noise spot (e.g., a black spot on a white background) would be expected to have a short run length (e.g. i=1) in the vertical direction, and equally limited extent horizontally (e.g., pixels at (p+1, s) and at (p−1, s) are nonblack). It should be appreciated that such noise will only appear if there is a source of noise in the system such as the scanning of a degraded hardcopy image. For ideal synthetic images generated by computer, no such noise will be present.

Run length and the color of the pixel run are used to determine the amount of adjustment. The color of the line is the complement of the color of the background found at position (p, s+1).

Figure 7:
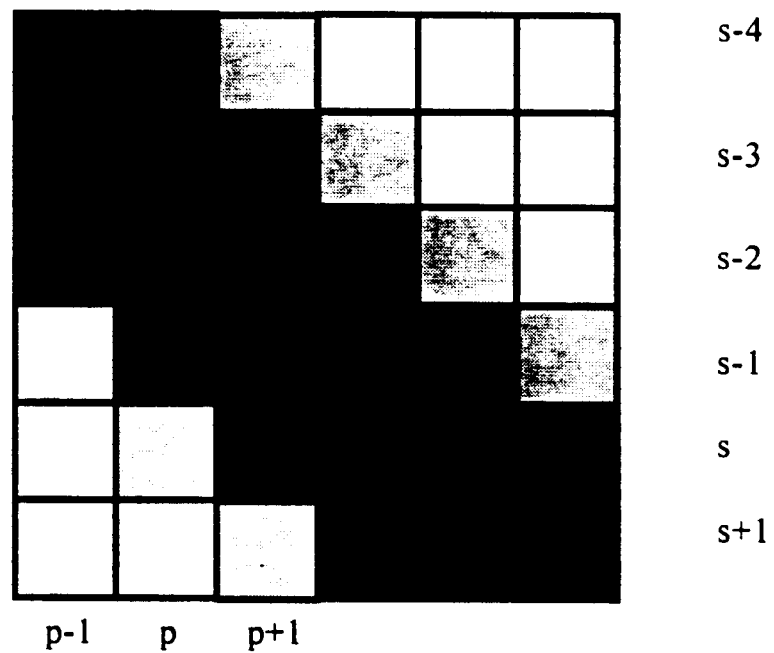
FIG. 7 illustrates a diagonal sequence of pixels.

Step S420 is similar for diagonal lines. The search for diagonal lines is similar, but instead of examining a vertical sequence of pixels, a diagonal sequence of pixels is examined as shown in FIG. 7. Therefore, within the diagonal pixel sequence, p is incremented or decremented as s is incremented. The pixel immediately adjacent to the leading edge must have the background non-gray value, and not just the pixel along the diagonal. For example, if a run in the direction where p is incremented while s is decremented is being tested, then the pixel at location (p−1, s+1) must be a non-gray pixel. However, the pixel at either (p, s+1) or (p−1, s) must have the same non-gray background value as the pixel at (p−1, s+1).

If further tests are desired to ensure that the pixel really belongs to a line edge, an additional test can be applied in which grayscale values of surrounding pixels are analyzed. For example, if the pixels at (p, s+1), (p, s−1) and (p−1, s−1) are all the background color or if the pixels at (p−1, s), (p+1, s) and (p+1, s+1) are all the background color, then further processing of the run can be terminated and the run discarded. The idea here is that there should not be pixels having background grayscale values on both sides of an edge pixel.

Determining the lengths of runs in the other diagonal direction where p decrements as s decrements is analogous to the above explanation.

Note that run lengths for diagonals actually differ from horizontal or vertical lengths by a factor of the square root of 2. Therefore, one may wish to re-scale diagonal run length or, even better, use a different adjustment table for horizontal runs than for diagonal runs and separate the processing into two stages.

Figure 8:
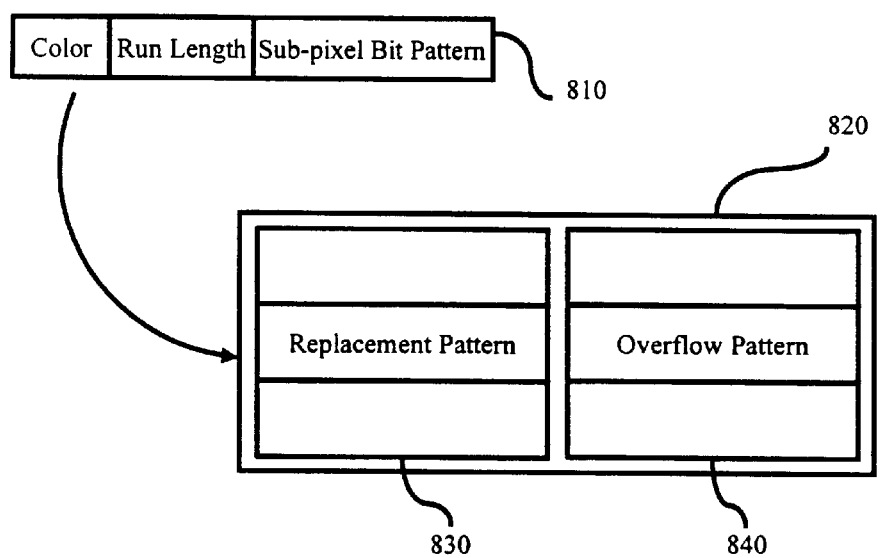
FIG. 8 illustrates a look up table architecture and corresponding table index used in conjunction with the exemplary embodiment.
Figure 9:
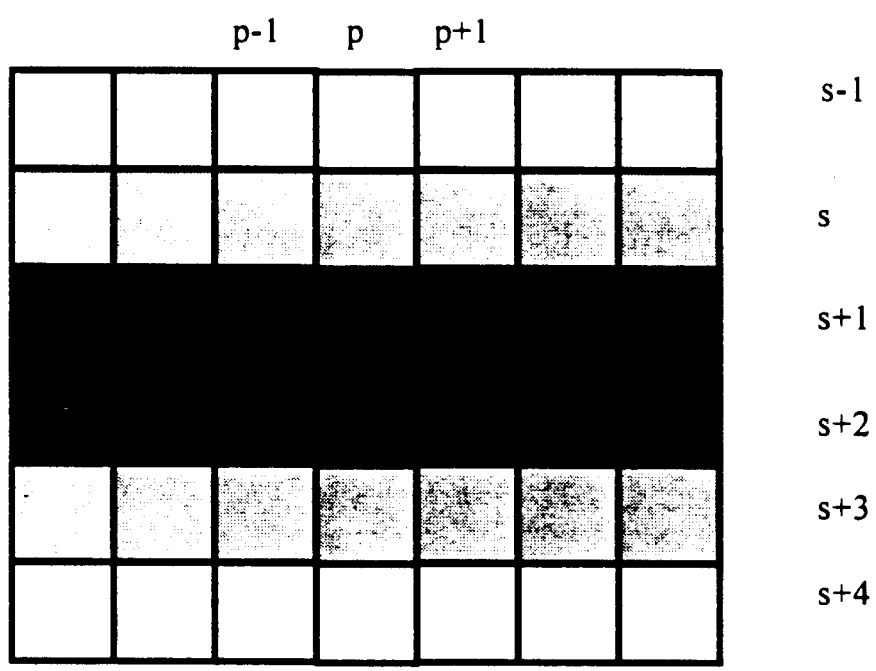
FIG. 9 illustrates a sequence of pixels stored in a buffer used in conjunction with the exemplary embodiment.

The method for performing line width adjustment continues to step S430, as shown in FIG. 4. Step S430 is the second stage of processing, in which the leading edge adjustment is calculated. Control then proceeds to step S440. Step S430 can be performed using a look up table using the run length and color as an index. Therefore, as illustrated in FIG. 8, the color and run length are listed in table index 810. The look up table 820 includes a replacement pattern section 830 and an overflow pattern section 840. The color of the line is taken to be the compliment of a background color in the image data. This table 820 provides the compensation for the marking engine's behavior. By referencing the table 820 based on the index 810, the table 820 provides information indicating how much to shrink or expand the line thickness.

Note that a current bit pattern for the edge pixel can also be included as part of the index 810 for the look up table 820. The table 820 can provide a new bit pattern including a replacement pattern and an overflow pattern corresponding to the current bit pattern. Different tables may also be employed based on a run direction so as to select a pattern of adjustment accordingly. Altering pattern selection based on run direction allows antialiased edges to grow or shrink in the proper direction as well as providing tailored half-bitting adjustment solutions.

When antialiasing is employed, the edge position can be specified to sub-pixel accuracy within the limits of high addressability. An edge may be anywhere within a pixel according to the sub-pixel specification. Because an edge can be located near a pixel boundary, a width adjustment can move the edge across the boundary and into a neighboring pixel. Therefore, the line width adjustment table should not only provide the replacement pattern for the current pixel, but also the pattern for a neighbor into which the adjustment overflows, if this should happen. Accordingly, the look up table 820 includes both the replacement pattern for the current pixel and an overflow pattern 840 for the neighboring pixel affected by overflow.

Processing is performed based on the assumption that the overflow is into a pixel with a grayscale value that is the background color. While this is typically the case, it is not necessarily true. Therefore, it should be appreciated that processing based on this assumption occasionally introduces small errors in the result.

For processing a leading edge of a horizontal line, an overflow for the pixel at (p,s) will affect the pixel at (p, s+1) if the edge expands and will affect (p, s−1) if the edge shrinks.

For processing edges of diagonal lines, the proper overflow is less clear. It is preferable to limit the effects of overflow to potentially occur in the two immediately adjacent pixels nearest the direction of growth or shrinkage. For example, if the run direction is chosen such that p increases as s decreases, then an expanding edge at (p, s) overflows into the two pixels near the edge at (p−1, s) and (p, s+1). If the edge shrinks, then the pixels at (p+1, s) and (p, s−1) are affected.

Whether a line edge grows or shrinks may be implied by the pixel run color. Alternatively, it may be a function of both pixel run color and pixel run width, in which case, line width adjustment can be provided by referencing the adjustment table 820.

Once the leading edge adjustments for each of the three directions (i.e., horizontal and two diagonals) have been calculated, their values must be reconciled with one another. This is because only a single final adjustment can be made to the positioning of the leading line edge. Therefore, the adjustment with the greatest modification to the leading edge is chosen from among the adjustments for each of the three directions. To facilitate this, replacement pixel section 830 of the adjustment table 820 can contain an amount of adjustment as well as a resulting adjusted pixel pattern. The overflow pattern 830 can also provide the amount of adjustment of the number of sub-pixels darkened for the overflow pixels.

The effects of overflows can affect the pixels near the pixel being considered, e.g., the two pixels above, below, right, or left of the current pixel. Therefore, if a black line is shrinking or a white line is expanding, the pattern with the fewest black sub-pixels should be selected. Similarly, if a white line is shrinking or a black line is expanding, the pattern with the greatest number of black sub-pixels should be selected.

In selecting the pattern, one can include the current pixel's original value as well as the values suggested by the possible overflow of the current pixel's width. For example, if a black leading edge at position (p, s) should be expanded, then the test for an edge of a horizontal line can suggest an overflow into the pixel at (p, s+1). One diagonal test can show possible overflow into the pixels at (p, s+1) and (p−1, s). The other diagonal test can show possible overflow into pixels at (p, s+1) and (p+1, s). Note that for the pixel at (p, s+1) a resulting pattern must be selected from among its original pattern and three possible overflow patterns. Since black is expanding into white, the pattern with the greatest number of black sub-pixels is selected.

The resolved pixel values for the current position (p, s) and overflow positions (p, s−1), (p−1, s) and (p, s+1) can be immediately revised in the pixel buffer. However, the revision of the pixel at (p+1, s) should be delayed to include changes from processing of the next two pixels. When the pixel at (p+1, s) is made to be the current pixel and calculation of possible adjustments is performed, any adjustments determined as necessary should take precedence over overflow adjustments. When processing returns to the next pixel so that (p+2, s) is the current position, then new overflow patterns for the left side of the new current pixel may be encountered. These new patters must be reconciled with the possible overflow patterns from the right side of the original pixel.

Another way to perceive processing is that, when (p, s) is the location of the current pixel, and the value of the pixel at (p−1, s) is to be reconciled, one must reconcile its current value with the left side overflow from the pixel at (p, s) and also with the right side overflow from pixel (p−2, s).

Along with computing leading edge adjustments, one must also calculate trailing edge adjustments. Therefore, in step S440, a trailing edge of the horizontal or diagonal line is identified within the high-addressability image data.

As in step S420, performance of step S440 differs depending on whether a horizontal line or a diagonal line is being analyzed. These processes are analogous to the leading edge cases, but there is a change of orientation. As illustrated in FIG. 8, the pixels on the next to last scan line within the buffer are considered for optimal use of the buffer.

It is this shift in orientation between leading and trailing edges that causes the reduction the amount of buffering required. During processing, the pixel of interest at the lower edge of the window is considered and analyzed for leading edges. Subsequently, the upper edge of the window is considered and analyzed for trailing edges.

In conventional processing, each pixel is considered only once for adjustment. That means that in that single test, one must simultaneously decide on adjustments due to its presence on a line above, or below, right or left. One must be able to examine the neighborhood in all directions about the pixel in question. To do this, one must hold in memory the pixels both above an below the pixel in question. If one is to recognize pixels on the edge of a line of width N then one needs a scan line for the pixel, N scan lines for the line and one more scan line to confirm that the line has ended. Thus, N+1 scans are needed above the scan line of the pixel and also N+1 scans are needed below it. Conventional processing thus requires the buffering of 2N+3 scan lines.

To the contrary, in the present invention one does not consider the pixel only once. Each pixel is considered twice, once shortly after it has entered the buffer, and again shortly before it is about to leave the buffer. When the scan enters the buffer there will be a buffer's worth of scan lines above it, but none below. Thus, when the scan enters the buffer, one has the information to determine if the pixel is on the edge of a line located above it, but not if it is on the edge of a line below it. However, just before a scan leaves the buffer, there will be a buffer's worth of scan below it, while none above. At that point, one can determine if a line is located below it. In both cases, the actual number of scans needed for the test is N+3. Therefore, by processing the pixel in two stages, the amount of buffering may be reduced from 2N+3 to N+3.

Because entire scan lines are present, the information about the behavior to the right or left of a pixel in question is always present. Accordingly, the check for vertical lines can be included in either of the two test stages. However, it is preferable to include the test for vertical lines as part of the second test stage so as to minimize the modification of the image prior to the second test stage. The tests for edges of horizontal and diagonal lines are the same as for leading edges except scan indices are incremented instead of decremented when determining runs.

The method for performing line width adjustment continues to step S450, as shown in FIG. 4. Step S450 is the second stage of processing, in which the trailing edge adjustment is calculated. Control then proceeds to step S460, in which a determination is made whether there is additional image data to be processed. If so, control returns to step S410. If not control proceeds to step S470, in which the method ends.

While this invention has been described in conjunction with the specific embodiments outlined above, it is evident that many alternatives, modifications and variations will be apparent to those skilled in the art. Accordingly, the preferred embodiments of the invention, as set forth above, are intended to be illustrative, not limiting. Various changes may be made without departing from the spirit and scope of the invention.

For example, although the benefits of the exemplary embodiment have been explained in conjunction with the use of a window of pixel values of width N+3, it should be appreciated that using a window of pixel values of width 2N+3 to detect lines up to width N allows the simultaneous testing for both leading and trailing edges. However, such an increase in window size requires additional scan-line buffering thereby increasing the memory costs associated with practicing the invention.

Additionally, the trailing edge processing can also include an adjustment for vertical lines (both leading and trailing edges). The tests for edges of vertical lines are analogous to those for horizontal lines with an exchange of the roles of scan and pixel indices. However, in addition to potentially adjusting a current pixel, implementation of a test for edges of vertical lines can also result in possible overflow adjustments to the pixels left and right of the current pixel. These adjustments must be reconciled with those arising from diagonal lines, for example, by selecting the adjustment that is greatest from among the possible overflow adjustments.

Moreover, specific implementations of the line width adjustment method can provide further refinement. For example, note that when a trailing edge of a horizontal line shrinks and overflows, the original pixel can change from gray to non-gray. This can trigger detection of the edge again when the next scan line is processed. One way of avoiding this double processing is to not replace the current pixel with a full non-gray value for this case. Instead, using a pattern that has one complimentary sub-pixel value is preferable. Thus, the pattern should be nearly black or white and should produce the desired imaging without triggering double edge processing of the edge.

What is claimed is:

1. A method for performing variable line width adjustment, the method comprising:

inputting high-addressability image data into a pixel buffer;

identifying a leading edge of a horizontal or diagonal line within the high-addressability image data in the pixel buffer;

determining an amount of leading edge adjustment;

identifying a trailing edge of a horizontal or diagonal line within the high-addressability image data in the pixel buffer;

determining an amount of trailing edge adjustment; and adjusting a line width based on the amount of leading edge adjustment and an amount of trailing edge adjustment.

2. The method of claim 1, wherein the high-addressability image data is raster image data that has been rendered as sub-pixel, bit patterns.

3. The method of claim 2, wherein the raster image data is produced halftoning contone image data with antialiased rendering to M×addressability for an addressability factor M.

4. The method of claim 3, wherein M is 8.

5. The method of claim 2, wherein the raster image data includes high-addressability sub-pixel data that are accessed in groups of M, where each group corresponds to a single pixel of the contone image data.

6. The method of claim 5, wherein M is 8.

7. The method of claim 1, wherein only N+3 scan lines are used to detect and adjust leading or trailing edges of lines, where N is the width of a line indicated by a pixel run length.

8. The method of claim 1, wherein only 2N+3 scan lines are used to detect and adjust leading and trailing edges of lines, where N is the width of a line indicated by pixel run length.

9. The method of claim 1, wherein the step of identifying a leading edge, identifies the leading edge of a horizontal line within a vertical sequence of pixels within the high-addressability image data.

10. The method of claim 9, wherein the step of identifying a leading edge is performed using a table look up, indexed by bits indicated whether the pixels in the vertical sequence are non-gray or gray.

11. The method of claim 1, wherein the step of identifying a leading edge includes performing a test to determine if a pixel at first position in a first scan line (p, s) is the leading edge of a horizontal line, the test comprising:

determining whether a pixel at the first position in a next scan line (p, s+1) is not gray;

determining whether the pixel at the first position in the first scan line (p, s) has an intensity value that does not match the an intensity value of the pixel at the first position at the next scan line (p, s+1);

determining a pixel run length as the number of pixels at the first position of the scan lines previous to the first scan line that are a complement of the intensity value of the pixel at the first position in the next scan line (p, s+1).

12. The method of claim 1, wherein the step of identifying a leading edge includes performing a test to determine if a pixel at a first position in a first scan line (p, s) is the leading edge of a diagonal line, the test comprising:

determining whether a pixel at a position left of the first position in a next scan line (p−1, s+1) is not gray;

determining whether a pixel at the first position in the next scan line (p, s+1) or a pixel at a position behind the first position in the first scan line (p−1, s) has an intensity value that matches the intensity value of the pixel at the first position in the next scan line (p−1, s+1).

13. The method of claim 12, wherein the test further comprises determining whether the pixel at the first position in the next scan line (p, s+1), the pixel at the first position in the previous scan line (p, s−1) and a pixel at the position behind the first position in a previous scan line (p−1, s−1) are all of a background color or the pixel at the position left of the first position in the first scan line(p−1, s), the pixel at the position right of the first position in the first scan line (p+1, s) and the pixel at the position right of the first position in the next scan line (p+1, s+1) are all of the background color.

14. The method of claim 13, further comprising determining the width of the line based on the pixel run length.

15. The method of claim 11, wherein the step of determining an amount of leading edge adjustment is performed using an adjustment look up table using the pixel run length and color as an index.

16. The method of claim 15, wherein pixel run length i is a count of pixels with identical values along a line (p+j, s−j) where j varies from 1 to i.

17. The method of claim 1, further comprising:
   determining the leading and trailing edges of vertical lines;
   determining the amounts of vertical leading edge adjustment and vertical trailing edge adjustment; and
   adjusting the line width based on the amount of vertical leading edge adjustment and the amount of vertical trailing edge adjustment.

18. A system for performing variable line width adjustment located in an image path after halftoning and anti-aliased rendering is performed on image data, the system comprising:
   a pixel buffer that receives and stores high-addressability image data;
   a leading edge identifier, coupled to the pixel buffer, that identifies a leading edge of a horizontal or diagonal line within the high-addressability image data in the pixel buffer;
   a leading edge adjustment amount module that determines an adjustment amount for a leading edge based in part on the identification of the leading edge by the leading edge identifier;
   a trailing edge identifier, coupled to the pixel buffer, that identifies a trailing edge of a horizontal or diagonal line within the high-addressability image data in the pixel buffer;
   a trailing edge adjustment amount module that determines an adjustment amount for a trailing edge based in part on the identification of the trailing edge by the trailing edge identifier; and
   an image data renderer that renders the high-addressability image data based in part on the adjustments determined by the leading edge adjustment amount module and the trailing edge adjustment amount module.

19. The system of claim 18, wherein the system of variable line width adjustment system is part of an image rendering system that performs halftoning, antialiased rendering and color image correction on raster image data prior to the image data being input to the variable line width adjustment.

20. A method for performing image adjustment, the method comprising:
   sequentially inputting image data into a pixel buffer, the pixel buffer holding a plurality of scan lines of the image data at any time;
   identifying a leading edge scan line of the plurality of scan lines in the buffer;
   identifying a trailing edge scan line of the plurality of scan lines in the buffer;
   adjusting at least one pixel value of a first pixel on or near the leading edge scan line in the pixel buffer according to properties of the image data behind the leading edge scan line; and
   simultaneously adjusting at least one pixel value of a second pixel on or near the trailing edge scan line in the pixel buffer according to properties of the image data on or before the trailing edge scan line.

21. The method of claim 20, wherein the adjustment to the at least one pixel value of the first pixel is a line width adjustment.

22. The method of claim 20, wherein the adjustment to the at least one pixel value of the second pixel is a line width adjustment.

23. The method of claim 20, wherein the adjustment to the at least one pixel value of the first pixel comprises determining at least two levels of adjustment to the at least one pixel value and determining a reconciliation between these at least two levels of adjustment.

24. The method of claim 23, wherein determining reconciliation includes choosing the greatest of the several potential adjustments.

25. The method of claim 23, wherein the at least two levels of adjustment include adjustments for horizontal and two diagonal directions.

26. The method of claim 20, wherein the adjustment to the at least one pixel value of the second pixel comprises determining at least two levels of adjustment to the at least one pixel value and determine a reconciliation between these at least two levels of adjustment.

27. The method of claim 20, wherein the at least two levels of adjustment includes four levels of adjustment, corresponding to a horizontal, vertical and two diagonal directions.

28. The method of claim 20, wherein the properties of the image data include a line width.

29. The method of claim 20, wherein the properties of the image data include a line color.

30. The method of claim 20, wherein the image data is high-addressability image data.

31. The method of claim 20, wherein the first pixel is a pixel next to a line.

32. The method of claim 20, wherein the second pixel is a pixel next to a line.

* * * * *